United States Patent
I et al.

(10) Patent No.: US 7,594,391 B2
(45) Date of Patent: Sep. 29, 2009

(54) EXHAUST SYSTEM AND CONTROL METHOD FOR AN INTERNAL COMBUSTION ENGINE

(75) Inventors: Sunki I, Kanagawa (JP); Takao Inoue, Kanagawa (JP); Kouichi Mori, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 160 days.

(21) Appl. No.: 11/407,510

(22) Filed: Apr. 20, 2006

(65) Prior Publication Data

US 2006/0236682 A1 Oct. 26, 2006

(30) Foreign Application Priority Data

Apr. 21, 2005 (JP) ................ 2005-123101

(51) Int. Cl.
*F01N 3/00* (2006.01)
(52) U.S. Cl. ............... 60/285; 60/274; 60/278; 60/287; 60/288; 60/290; 60/291; 60/324
(58) Field of Classification Search ............ 60/274, 60/278, 285, 286, 287, 288, 290, 291, 292, 60/324
See application file for complete search history.

(56) References Cited

U.S. PATENT DOCUMENTS

| | | | | |
|---|---|---|---|---|
| 5,293,741 A | * | 3/1994 | Kashiyama et al. | 60/284 |
| 5,331,809 A | * | 7/1994 | Takeshima et al. | 60/288 |
| 5,386,694 A | * | 2/1995 | Ogawa et al. | 60/276 |
| 5,836,152 A | * | 11/1998 | Schatz | 60/274 |
| 6,192,675 B1 | * | 2/2001 | Hirota et al. | 60/286 |
| 6,345,496 B1 | | 2/2002 | Fuwa et al. | |
| 6,681,567 B2 | * | 1/2004 | Yasui et al. | 60/297 |
| 6,729,123 B2 | * | 5/2004 | Tamura et al. | 60/285 |

FOREIGN PATENT DOCUMENTS

| | | |
|---|---|---|
| EP | 0586176 A | 3/1994 |
| FR | 1413228 A | 10/1965 |
| GB | 2280711 A | 2/1995 |
| JP | 61053430 | 3/1986 |
| JP | H05-321644 | 12/1993 |
| JP | 09228826 | 9/1997 |
| JP | 2000220441 | 8/2000 |

OTHER PUBLICATIONS

European Search Report No. 06252159.6-2311 dated Jul. 13, 2006.

* cited by examiner

*Primary Examiner*—Binh Q Tran
(74) *Attorney, Agent, or Firm*—Global IP Counselors, LLP

(57) ABSTRACT

An exhaust system for an internal-combustion engine comprises an exhaust bypass in parallel with an upstream portion of a main exhaust path having a main catalytic converter in a downstream portion thereof; an exhaust bypass catalytic converter provided in the exhaust bypass; and a flow path switching valve for blocking the main exhaust path at the upstream portion thereof. The exhaust system includes an ignition timing adjustment mechanism for adjusting ignition timing to delay sparking when the flow path switching valve is switched from the closed condition to the open condition thereof. A control method for the exhaust system is also disclosed.

22 Claims, 4 Drawing Sheets

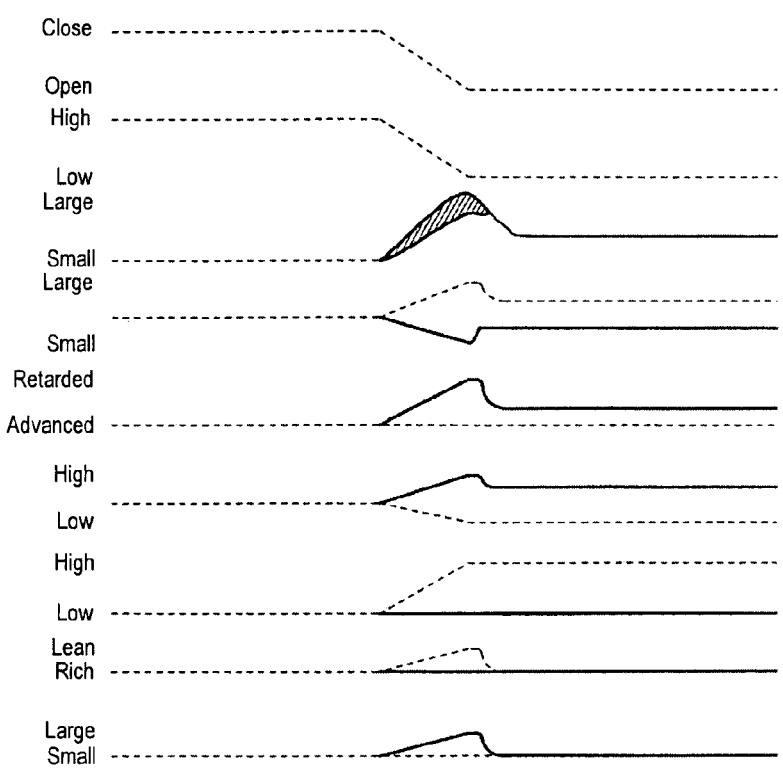

Switching valve aperture
Close / Open

Exhaust back pressure
High / Low

Catalyst entrance gas Vol.
Large / Small

Intake air amount
Large / Small

ADV.
Retarded / Advanced

EGR rate
High / Low

Generated Torque
High / Low

A/F
Lean / Rich

Fuel Injection amount
Large / Small

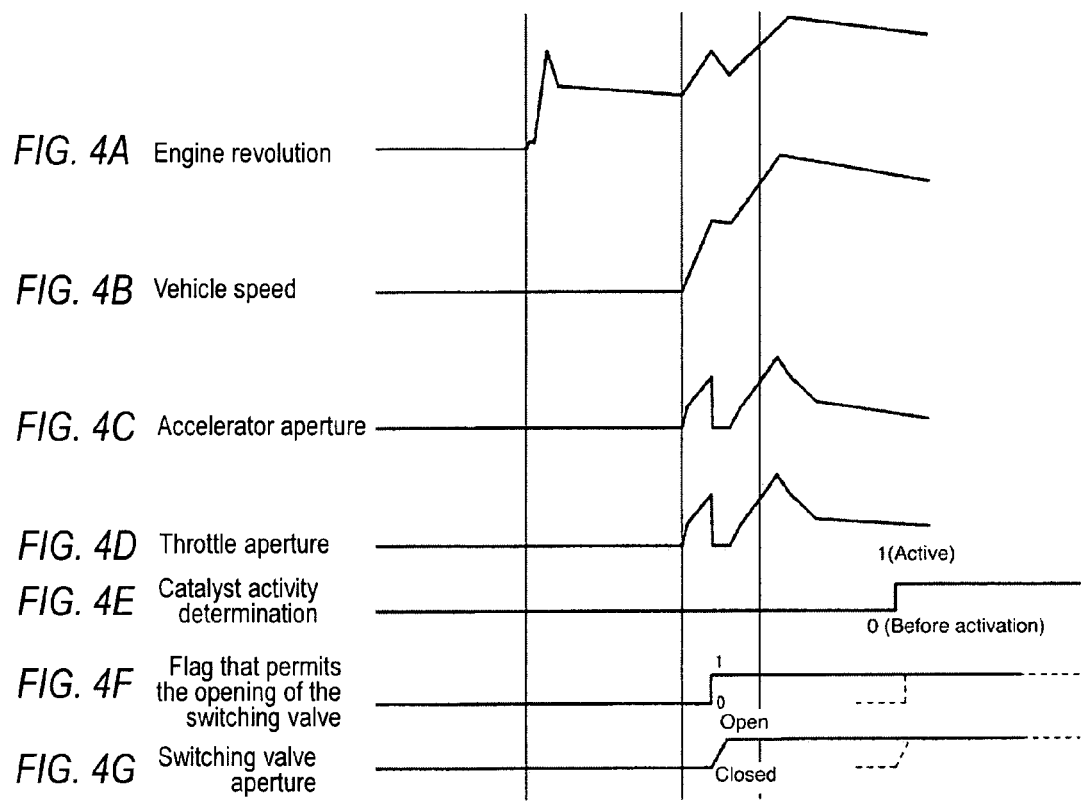

EXHAUST SYSTEM AND CONTROL METHOD FOR AN INTERNAL COMBUSTION ENGINE

RELATED APPLICATION

The disclosure of Japanese Patent Application No. Japanese Application No. 2005-123101, filed Apr. 21, 2005, including the specification, claims and drawings, is incorporated herein by reference in its entirety.

FIELD

Described herein is an exhaust system for an internal-combustion engine in which, by operating a flow path switching valve upon a cold start, the exhaust gases are guided to an exhaust bypass having an exhaust bypass catalytic converter upstream relative to the exhaust system. Also described herein is an adjustment control method carried out upon operation of the flow path switching valve.

BACKGROUND

Structure is known in which a main catalytic converter at the underbody of a vehicle is disposed downstream of an exhaust system of the vehicle's internal-combustion engine. With this arrangement, sufficient exhaust purification cannot be expected after starting the engine under cold conditions until the catalytic converter is activated with its temperature raised. In contrast, if the catalytic converter were arranged upstream relative to the exhaust system; that is, closer to the engine, durability would be reduced due to thermal deterioration of the catalyst.

Therefore, as disclosed in Japanese Laid-Open Patent Application No. H05-321644, proposals have been made for an exhaust system in which an exhaust bypass is provided parallel to the upstream portion of the main exhaust path in which there is a main catalytic converter, and another catalytic converter is provided in the exhaust bypass, the exhaust gases being guided to the exhaust bypass immediately after starting under cold conditions by means of a switching valve that switches between the main exhaust path and the exhaust bypass. With this structure, the exhaust bypass catalytic converter is located upstream relative to the main catalytic converter, and exhaust purification can be commenced at an earlier stage because catalyst activation is carried out at a relatively early stage.

SUMMARY

The present exhaust system for an internal-combustion engine comprises an exhaust bypass in parallel with the upstream portion of a main exhaust path having a main catalytic converter in its downstream portion. An exhaust bypass converter is provided in the exhaust bypass, and a flow path switching valve is provided for blocking the main exhaust path at its upstream portion when the valve is in a closed position. An ignition timing device is also provided for adjusting the ignition timing to delay ignition when the switching valve is moved from its closed position to its open position.

BRIEF DESCRIPTION OF DRAWINGS

These and other features and advantages of the present exhaust system and control method will be apparent from the ensuing description taken in conjunction with the accompanying drawings, in which:

FIGS. 2A-2I are a series of time charts showing an example of the present control method, in which the flow path switching valve is open during normal operation;

FIGS. 4A-4G are a series of time charts showing an example of the present control method, in which the flow path switching valve is opened upon an increase in load.

DETAILED DESCRIPTION

An embodiment of the present exhaust system and control method is hereinafter described in detail as being applied to a serial four-cylinder internal-combustion engine.

Figure 1:
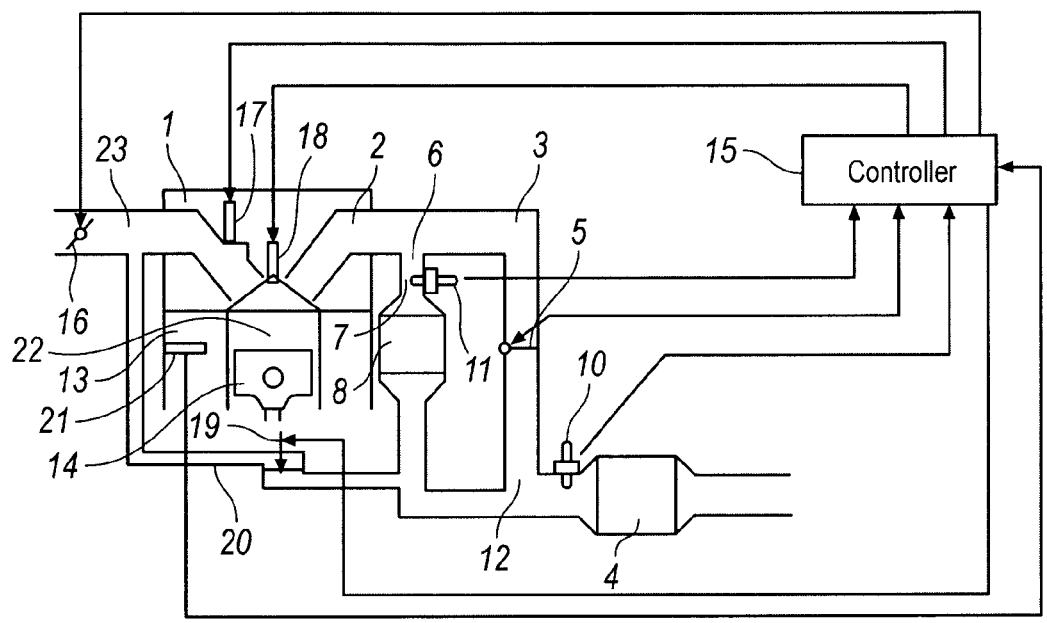
FIG. 1 is a schematic view showing the layout of an embodiment of the present exhaust system.
Figure 3A:
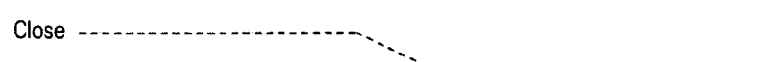
FIGS. 3A-3G are a series of time charts showing an example of the present control method, in which the flow path switching valve is opened during moderate acceleration.
Figure 3B:
Figure 3C:
Figure 3D:
Figure 3E:
Figure 3F:
Figure 3G:
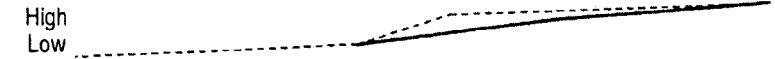
Figure 3H:
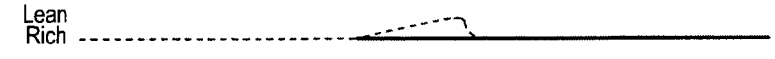
Figure 3I:
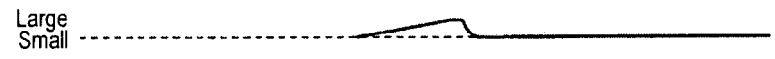

Referring to FIG. 1, a combustion chamber 22 is formed by a cylinder bore provided in a cylinder block 13, a cylinder head 1 attached to the cylinder block, and a piston 14 received in the cylinder bore. Air regulated by a throttle valve 16 is supplied to the combustion chamber 22 from an inlet path 23 at the same time that fuel is injected in the combustion chamber 22 by a fuel injection valve 17. Exhaust gases adjusted by an EGR valve 19 are recirculated to the inlet path 23 via an EGR path 20. The air-fuel mixture formed by the air and fuel supplied to the combustion chamber 22 is ignited by sparking an ignition plug 18. A temperature sensor 21 provided on the cylinder block 13 detects the engine temperature (temperature of the coolant). The exhaust gases resulting from combustion are discharged from the combustion chamber 22 via an exhaust port 2.

Exhaust ports 2 for each of a series of four like cylinders are provided on a lateral side of the cylinder head 1. Main exhaust paths 3 are connected to each of the exhaust ports 2. The four main exhaust paths 3 for the respective cylinders are joined in a single flow path, and a main catalytic converter 4 is arranged in the downstream side thereof. The main catalytic converter 4 has a large capacity and is disposed at the underbody of the vehicle; it contains, for example, a three-way catalyst and an HC trap catalyst. The main exhaust paths 3 and main catalytic converter 4 comprise the main flow path for the exhaust gases during normal operation. In addition, a flow path switching valve 5 that opens and closes each of the main exhaust paths 3 simultaneously is provided at the junction of the four main exhaust paths 3.

An exhaust bypass 7 having a smaller cross-sectional area than that of each of the main exhaust paths 3 branches out from each of them. A branching point 6 at the upstream end of each bypass 7 is arranged as far upstream as possible of the main exhaust path 3. The four bypasses 7 eventually join into a single flow path at their downstream ends, and an exhaust bypass catalytic converter 8 using a three-way catalyst is provided immediately downstream of the point at which they join. The exhaust bypass catalytic converter 8 is of compact form, having a smaller capacity than that of the main catalytic converter 4, and it preferably includes a catalyst having superior activity at low temperatures. The downstream portion of the exhaust bypass, which extends from the exit end of the exhaust bypass catalytic converter 8, is connected to the upstream portion of the main catalytic converter 4 in the main exhaust path 3 at a junction 12 (whereby the flow path switching valve 5 is upstream of the junction 12).

Air-fuel ratio sensors 10 and 11 are provided respectively at the entrance of the main catalytic converter 4 and at the entrance of the exhaust bypass catalytic converter 8. The flow path switching valve 5, air-fuel ratio sensors 10 and 11, throttle valve 16, fuel injection valve 17, ignition plug 18, EGR valve 19, and temperature sensor 21 are all connected to the controller 15. The controller regulates the aperture of the flow path switching valve, the intake air amount, the fuel injection amount, the ignition timing, the EGR amount, etc., based on the detected engine temperature and the exhaust air-fuel ratio.

During the stage in which the temperature of the engine or the exhaust gases is relatively low immediately after a cold start, the flow path switching valve 5 is closed by means of an appropriate actuator, and thus the main exhaust path 3 is blocked. Therefore the entire volume of the exhaust gases discharged from each cylinder flows into the exhaust bypass 7 via the branching point 6, and thence to the exhaust bypass catalytic converter 8. The exhaust bypass catalytic converter 8, being located at the upstream portion of the exhaust system close to the exhaust port 2, and being of compact form, is immediately activated and begins exhaust purification at an early period.

When the warming of the engine progresses and the temperature of the engine or the exhaust gases becomes sufficiently high, the flow path switching valve 5 is opened. When this occurs, the exhaust gases discharged from each cylinder pass mostly through the main exhaust path 3 to the main catalytic converter 4. At this time, the exhaust bypass 7 is not necessarily blocked; nonetheless, since the exhaust bypass 7 has a smaller cross-sectional area than that of the main exhaust path 3, and since the exhaust bypass catalytic converter 8 is provided in the exhaust bypass, therefore, due to the difference in path resistance, a major portion of the exhaust gases flows through the main exhaust path 3 and there is very little flow through the exhaust bypass 7. Thus, thermal deterioration of the exhaust bypass catalytic converter 8 is satisfactorily limited.

When the flow path switching valve 5 opens the main exhaust path 3, as described above, the path resistance of the main exhaust path 3 is relatively low, so that the exhaust pressure rapidly decreases and if it remains as is, uneven torque, namely an increase in torque is generated. In addition, when the switching valve 5 opens the main exhaust path 3, the thin exhaust gas, which is close to the atmospheric state, and which has accumulated in the main exhaust path 3, flows into the main catalytic converter 4 downstream, and consequently the exhaust air-fuel ratio in the main catalytic converter 4 temporarily becomes relatively lean, thereby temporarily reducing the exhaust purification performance of the three-way catalyst.

Therefore, according to the present control method, the uneven torque is eased by delaying sparking by means of the ignition timing when the flow path switching valve 5 opens, and at the same time, the tendency of the exhaust air-fuel ratio to become lean is limited by increasing the amount of fuel injection.

FIGS. 2A-2I are a series of time charts that explain a variety of the operations described above. This is an example in which the flow path switching valve 5 is open during normal operation. In this figure, interrupted lines show properties when the present control is not employed and solid lines show such properties when the present control is employed. As shown FIG. 2A, when warming of the engine is completed, the flow path switching valve 5 is open, and as shown in FIG. 2B, the exhaust pressure decreases. Because of this, the amount of gas flow at the entrance of the main catalytic converter 4 increases as shown in FIG. 2C. Here the shaded portion in FIG. 2C is the increase due to the gas accumulated between the branching point 6 and the junction 12 with the main exhaust path 3. For such a change, according to the present embodiment, sparking is temporarily adjusted by delaying ignition timing as shown by the solid line in FIG. 2E. At the same time, the aperture of the electronically controlled throttle valve in the inlet path is temporarily adjusted to decrease the amount of the intake air as shown by the solid line in FIG. 2D. At the same time, the exhaust flux rate of the exhaust recirculation system not shown in the figure is adjusted to increase as shown by the solid line in FIG. 2F. Due to the above-mentioned adjustment, the torque generated by the internal-combustion engine is flat; that is, there is no uneven torque, as shown by the solid line in FIG. 2G.

In addition, the amount of fuel injection is temporarily adjusted to increase as shown by the solid line in FIG. 2I, and consequently the exhaust air-fuel ratio at the entrance of the main catalytic converter 4 has a flat property as shown by the solid line in FIG. 2H. In other words, the air-fuel ratio in the combustion chamber of the engine becomes temporarily rich compared to the theoretical air-fuel ratio, thereby canceling the effect of the accumulated gases close to the atmospheric state. By doing so, desirable exhaust purification performance of the three-way catalyst of the main catalytic converter can be obtained.

FIGS. 3A-3G are a series of time charts similar to those of FIGS. 2A-2I. It shows, in particular, the case in which the flow path switching valve 5 opens during moderate acceleration of the internal-combustion engine. In this case, similarly to the above-explained example in FIGS. 2A-2I, uneven torque is eased by delayed sparking of the ignition timing, the limiting of the amount of intake air, and the increase in the exhaust recirculation rate, and as shown by the solid line in FIG. 3G, the torque moderately increases as directed by the driver. In addition, by increasing the amount of fuel injection, the tendency of the exhaust air-fuel ratio to become relatively lean at the entrance of the main catalytic converter 4.

In principle, the flow path switching valve 5 is, as described above, switched from the closed condition to the opened condition in response to the warming of the engine, namely the activation of the main catalytic converter 4; nonetheless, even before the main catalytic converter 4 is activated, if the requested load exceeds a designated level, it is switched to the open condition in order to avoid a reduction in torque due to air-flow resistance.

FIGS. 4A-4G are a series of time charts and shows an example of engine operation. FIG. 4A is engine revolution, FIG. 4B is vehicle speed, FIG. 4C is the accelerator aperture, FIG. 4D is the throttle valve aperture, FIG. 4E is the catalyst activity determination flag for the main catalytic converter 4, FIG. 4F is the state of the flag that permits the opening of the flow path switching valve 5, and FIG. 4G is the aperture of the flow path switching valve 5. As shown in FIGS. 4A-4G, when the aperture of the throttle valve (or the aperture of the accelerator) becomes larger than a predetermined aperture size, the flag that permits opening becomes active 1 even before activation of the catalyst and the flow path switching valve 5 opens. Therefore the exhaust pressure is reduced and the requested torque is maintained. In addition, when such a high-load state is not detected, when the catalyst activation determination flag that indicates activation of the catalyst becomes active 1, the flow path switching valve 5 opens as shown by an interrupted line.

Therefore the present exhaust system structure comprises an exhaust bypass provided in parallel with the upstream portion of a main exhaust path having a main catalytic converter at its downstream portion; an exhaust bypass catalytic converter provided in the exhaust bypass; and a flow path switching valve that blocks the main exhaust path at its upstream portion, wherein the ignition timing is adjusted to delay sparking when the flow path switching valve is switched from the closed condition to the open condition. By doing so, the torque of the internal-combustion engine is temporarily reduced, thereby easing uneven torque.

For example, the path resistance of the main exhaust path when the above-mentioned flow path switching valve is in its open condition is lower than the path resistance of the exhaust bypass. In this case, the change in exhaust pressure is relatively great when the flow path switching valve is switched from its closed to its open condition; nonetheless, uneven torque can be limited with good responsiveness by adjusting the ignition timing to delay sparking.

In order to ease uneven torque, it is acceptable to temporarily adjust the throttle valve aperture in the decreasing direction. Alternatively, the amount of the exhaust recirculation can be temporarily adjusted in the increasing direction.

In addition, the amount of the fuel supply can be temporarily adjusted in the increasing direction in order to avoid deterioration of exhaust purification performance due to flowing of relatively thin exhaust gases close to the atmospheric state, which have accumulated in the main exhaust path, into the main catalytic converter. For example, the engine air-fuel ratio based on the amount of intake air is adjusted on the rich side so that it cancels out the leanness of the exhaust air-fuel ratio at the entrance of the main catalytic converter when the flow path switching valve opens. This avoids making the exhaust air-fuel ratio relatively lean at the entrance of the main catalytic converter when the flow path switching valve opens the main exhaust path, thereby maintaining the exhaust air-fuel ratio at the amount equivalent to a predetermined air-fuel ratio, and consequently desirable exhaust purification performance can be obtained.

According to an embodiment of the present exhaust system and control method, each of the adjustment amounts becomes greater as the aperture of the flow path switching valve enlarges. When the flow path switching valve is reaches a fully open condition, the amount of the adjustment decreases.

According to the present exhaust system and control method, when the flow path switching valve that switches the flow path between the main exhaust path and the exhaust bypass is switched to an open condition from a closed condition, a large uneven torque due to the change in the exhaust pressure is not generated, and in addition, a temporary reduction of the exhaust purification performance of the main catalytic converter can be avoided. In other words, the exhaust purification performance immediately after a cold start can be improved without having an adverse effect on operability or exhaust purification performance after the engine has warmed.

While this invention has been described with respect to an embodiment where the flow path switching valve is opened from a closed condition, it is understood that this invention may also be applied by in the opposite direction where the flow path switching valve is closed from an open condition.

While the present exhaust system and control method have been described in connection with a certain specific embodiment thereof, this is by way of illustration and not of limitation, and the appended claims should be construed as broadly as the prior art will permit.

What is claimed is:

1. An exhaust system for an internal-combustion engine comprising:
   an exhaust bypass that is positioned in parallel with an upstream portion of a main exhaust path having a main catalytic converter in a downstream portion thereof;
   an exhaust bypass catalytic converter provided in the exhaust bypass; and
   a flow path switching valve for at least partially blocking the main exhaust path at the upstream portion thereof; and
   wherein the exhaust system includes an ignition timing adjustment mechanism for adjusting ignition timing when the flow path switching valve is switched; and
   wherein the ignition timing adjustment mechanism retards the ignition timing when the flow path switching valve is switched from a closed condition to an open condition thereof so as to control torque fluctuation generated thereby.

2. An exhaust system for an internal-combustion engine according to claim 1, wherein
   the ignition timing delay becomes greater as the size of an aperture defined by the flow path switching valve increases.

3. An exhaust system for an internal-combustion engine according to claim 1, wherein
   a path resistance of the main exhaust path is lower than a path resistance of the exhaust bypass when the flow path switching valve is in the open condition thereof.

4. An exhaust system for an internal-combustion engine according to claim 1, further comprising
   a throttle valve aperture adjustment mechanism for adjusting a throttle valve aperture;
   wherein the throttle valve aperture is adjusted in a decreasing direction by the throttle valve aperture adjustment mechanism when the flow path switching valve is switched from the closed condition to the open condition thereof.

5. An exhaust system for an internal-combustion engine according to claim 4, wherein
   the throttle valve aperture becomes smaller as the size of an aperture defined by the flow path switching valve increases.

6. An exhaust system for an internal-combustion engine according to claim 1, further comprising
   an exhaust recirculation amount adjustment mechanism for adjusting an amount of the exhaust recirculation;
   wherein the amount of exhaust recirculation is adjusted in the increasing direction by the exhaust recirculation amount adjustment mechanism when the flow path switching valve is switched from the closed condition to the open condition thereof.

7. An exhaust system for an internal-combustion engine according to claim 6, wherein
   the amount of exhaust recirculation becomes greater as the size of an aperture defined by the flow path switching valve increases.

8. An exhaust system for an internal-combustion engine according to claim 1, wherein
   an amount of fuel supplied to the internal combustion engine is adjusted in the increasing direction when the flow path switching valve is switched from the closed condition to the open condition thereof.

9. An exhaust system for an internal-combustion engine according to claim 8, wherein
   the amount of fuel becomes greater as the size of an aperture defined by the flow path switching valve increases.

10. An exhaust system for an internal-combustion engine according to claim 8, wherein
    an engine air-fuel ratio based on an amount of intake air is adjusted in the richer direction by increasing the amount of fuel when the flow path switching valve is opened, thereby canceling out leanness of an exhaust air-fuel ratio at an entrance of the main catalytic converter.

11. An exhaust system for an internal-combustion engine according to claim 10, wherein
the engine air-fuel ratio becomes richer as the size of an aperture defined by the flow path switching valve increases.

12. A control method for an exhaust system of an internal-combustion engine, the exhaust system comprising:
providing an exhaust bypass in parallel with an upstream portion of a main exhaust path having a main catalytic converter in a downstream portion thereof;
providing an exhaust bypass catalytic converter in the exhaust bypass; and
providing a flow path switching valve for at least partially blocking the main exhaust path at the upstream portion thereof; and
adjusting ignition timing to delay sparking when the flow path switching valve is switched from a closed condition to an open condition thereof so as to control torque fluctuation generated thereby.

13. A control method for an exhaust system of an internal-combustion engine according to claim 12, wherein
the adjusting amount of the delay of ignition timing is increased as the size of an aperture defined by the flow path switching valve increases.

14. A control method for an exhaust system of an internal-combustion engine according to claim 12, wherein
a path resistance of the main exhaust path is lower than a path resistance of the exhaust bypass when the flow path switching valve is switched to the open condition thereof.

15. A control method for an exhaust system of an internal-combustion engine according to claim 12, further comprising:
adjusting a throttle valve to decrease a throttle valve aperture when the flow path switching valve is switched from the closed condition to the open condition thereof.

16. A control method for an exhaust system of an internal-combustion engine according to claim 15, wherein
the throttle valve aperture is decreased in size as the size of an aperture defined by the flow path switching valve increases.

17. A control method for an exhaust system of an internal-combustion engine according to claim 12, including
adjusting the amount of exhaust recirculation in the increasing direction when the flow path switching valve is switched from the closed condition to the open condition thereof.

18. A control method for an exhaust system of an internal-combustion engine according to claim 17, wherein
the amount of exhaust recirculation is enlarged as the size of an aperture defined by the flow path switching valve is increased.

19. A control method for an exhaust system of an internal-combustion engine according to claim 12, including
adjusting an amount of fuel supply to the internal-combustion engine in the increasing direction when the flow path switching valve is switched from the closed condition to the open condition thereof.

20. A control method for an exhaust system of an internal-combustion engine according to claim 19, wherein
the amount of fuel supply is enlarged as the size of an aperture defined by the flow path switching valve increases.

21. A control method for an exhaust system of an internal-combustion engine according to claim 19, including
adjusting an engine air-fuel ratio based on the amount of intake air in the richer direction by increasing the amount of fuel when the flow path switching valve is opened, thereby canceling out leanness of an exhaust air-fuel ratio at an entrance of the main catalytic converter.

22. A control method for an exhaust system of an internal-combustion engine according to claim 21, wherein
the engine air-fuel ratio is enriched as the size of an aperture defined by the flow path switching valve increases.

* * * * *